(12) United States Patent
Bourque

(10) Patent No.: US 11,461,611 B2
(45) Date of Patent: Oct. 4, 2022

(54) SYSTEM AND METHOD FOR RFID ENABLING, TAGGING, AND TRACKING ITEMS NEEDING TO BE PRESERVED IN A CRYOGENIC STATE

(71) Applicant: Avery Dennison Retail Information Services, LLC, Mentor, OH (US)

(72) Inventor: Douglas Bourque, Rowlett, TX (US)

(73) Assignee: Avery Dennison Retail Information Services LLC, Mentor, OH (US)

( * ) Notice: Subject to any disclaimer, the term of this patent is extended or adjusted under 35 U.S.C. 154(b) by 0 days.

(21) Appl. No.: 16/229,991

(22) Filed: Dec. 21, 2018

(65) Prior Publication Data

US 2019/0205720 A1     Jul. 4, 2019

Related U.S. Application Data

(60) Provisional application No. 62/611,198, filed on Dec. 28, 2017.

(51) Int. Cl.
    *G06K 19/06*     (2006.01)
    *G06K 19/077*    (2006.01)
    *G06K 7/08*      (2006.01)
    *G06K 19/02*     (2006.01)

(52) U.S. Cl.
    CPC ....... *G06K 19/07758* (2013.01); *G06K 19/02* (2013.01); *G06K 19/0776* (2013.01)

(58) Field of Classification Search
    USPC ................. 235/375, 385, 451, 492
    See application file for complete search history.

(56) References Cited

U.S. PATENT DOCUMENTS

| | | | |
|---|---|---|---|
| 10,748,050 B2 * | 8/2020 | Morris | B65D 43/065 |
| 10,762,308 B1 * | 9/2020 | Ambartsoumian | A01N 1/0242 |
| 2003/0136503 A1 * | 7/2003 | Green | B32B 38/0004 156/264 |
| 2005/0247782 A1 | 11/2005 | Ambartsoumian | |
| 2006/0261649 A1 * | 11/2006 | Baldwin | A44B 11/14 297/250.1 |
| 2006/0261946 A1 * | 11/2006 | Himberger | G06K 19/0717 340/572.1 |
| 2007/0191690 A1 * | 8/2007 | Hasse | A61M 5/14546 600/300 |

(Continued)

FOREIGN PATENT DOCUMENTS

WO     2017/109153     6/2017

OTHER PUBLICATIONS

International Search Report and Written Opinion dated Mar. 15, 2019 issued in corresponding IA No. PCT/US2018/067178 filed Dec. 21, 2018.

(Continued)

*Primary Examiner* — Tuyen K Vo

(57) ABSTRACT

A system and method which provides RFID enabling for cryo-vials and other cryogenic items is disclosed. The system and method is a two part method wherein first each vial is individually RFID tagged and then a plurality of tagged vials are secured into a cane. The second part comprises creating an RFID tag and attaching the tag to the top of the cane of vials. The individual RFID tags on the vials are then associated with the RFID tag on the cane.

20 Claims, 7 Drawing Sheets

(56) References Cited

U.S. PATENT DOCUMENTS

| | | | |
|---|---|---|---|
| 2011/0199187 A1* | 8/2011 | Davidowitz | B01L 3/545 |
| | | | 340/10.1 |
| 2013/0255283 A1* | 10/2013 | Berchowitz | F25D 11/00 |
| | | | 62/63 |
| 2014/0184390 A1* | 7/2014 | Elizondo, II | G06K 19/07786 |
| | | | 340/10.1 |
| 2015/0379390 A1 | 12/2015 | Morris | |
| 2016/0026911 A1* | 1/2016 | Morris | A61J 1/165 |
| | | | 220/560.04 |
| 2017/0053071 A1* | 2/2017 | Caputo | G06K 19/0776 |
| 2019/0092555 A1* | 3/2019 | Ma | A01N 1/0268 |

OTHER PUBLICATIONS

International Preliminary Report on Patentability dated Jun. 30, 2020 issued in corresponding IA No. PCT/US2018/067178 filed Dec. 21, 2018.

* cited by examiner

SYSTEM AND METHOD FOR RFID ENABLING, TAGGING, AND TRACKING ITEMS NEEDING TO BE PRESERVED IN A CRYOGENIC STATE

CROSS-REFERENCE TO RELATED APPLICATION(S)

The present application claims priority to and the benefit of United States provisional utility patent application No. 62/611,198 filed Dec. 28, 2017, which is incorporated herein by reference in its entirety.

BACKGROUND

The present invention relates generally to creating a secondary RFID tag on each of a plurality of vials that are attached to a cane, and then associating the tagged vials to a primary RFID tag on the cane. More specifically, the RFID tags are capable of being used with cryogenic vials and canes without breaking down and without exposing the vial contents to the ambient air. The present subject matter is especially suitable for cryogenic medication containers. Accordingly, the present specification makes specific reference thereto. However, it will be appreciated to those of ordinary skill in the art that aspects of the present inventive subject matter are also equally amenable to other applications.

By way of background, radio-frequency identification (RFID) is the use of electromagnetic energy (EM energy) to stimulate a responsive device (known as an RFID "tag" or transponder) to identify itself and in some cases, provide additionally stored data. RFID tags typically include a semiconductor device commonly called the "chip" on which are formed a memory and operating circuitry, which is connected to an antenna. Typically, RFID tags act as transponders, providing information stored in the chip memory in response to a radio frequency (RF) interrogation signal received from a RFID reader, also referred to as an interrogator. In the case of passive RFID devices, the energy of the interrogation signal also provides the necessary energy to operate the RFID device.

RFID tags may be incorporated into or attached to articles to be tracked. In some cases, the tag may be attached to the outside of an article with adhesive, tape, or other means and in other cases, the tag may be inserted within the article, such as being included in the packaging, located within the container of the article, or sewn into a garment. The RFID tags are manufactured with a unique identification number which is typically a simple serial number of a few bytes with a check digit attached. This identification number is incorporated into the tag during manufacture. The user cannot alter this serial/identification number and manufacturers of RFID tags typically guarantee that each serial number is used only once. This configuration represents the low cost end of the technology in that the RFID tag is read-only and it responds to an interrogation signal only with its identification number. Typically, the tag continuously responds with its identification number. Data transmission to the tag is not possible. These tags are very low cost and are produced in enormous quantities.

Such read-only RFID tags typically are permanently attached to an article to be tracked and, once attached, the serial number of the tag is associated with its host article in a computer database. Specifically, an object of the tag is to associate it with an article throughout the article's life in a particular facility, such as a manufacturing facility, a transport vehicle, a health care facility, a pharmacy storage area, or other environment, so that the article may be located, identified, and tracked, as it is moved. Tracking the articles through the facility can assist in generating more efficient dispensing and inventory control systems as well as improving overall work flow in a facility. This results in better inventory control and lowered costs. In the case of medical supplies and devices, it is desirable to develop accurate tracking, inventory control systems, and dispensing systems so that RFID tagged devices and articles may be located quickly should the need arise, and may be identified for other purposes, such as expiration dates or product recalls.

Many RFID tags used today are passive in that they do not have a battery or other autonomous power supply and instead, must rely on the interrogating energy provided by an RFID reader to provide power to activate the tag. Passive RFID tags require an electromagnetic field of energy of a certain frequency range and certain minimum intensity in order to achieve activation of the tag and transmission of its stored data. Another choice is an active RFID tag; however, such tags require an accompanying battery to provide power to activate the tag, thus increasing the expense and the size of the tag and making them undesirable for use in a number of applications where cost or size is of primary concern.

Depending on the requirements of the RFID tag application, such as the physical size of the articles to be identified, their location, and the ability to reach them easily, tags may need to be read from a short distance or a long distance by an RFID reader. Furthermore, the read range (i.e., the range of the interrogation and/or response signals) of RFID tags is also limited.

Furthermore, when using sealed cryogenic medication vials, as well as other sealed containers, there is no easy way to RFID enable vials that are put into cryo-tanks and that need to be inventoried/counted on a regular basis. Vials are typically barcoded but this causes someone to have to manually take the vials completely out of the cryo-tank, wipe the vials off so that the barcode can be read, and then actually read/scan the barcode. This prolonged exposure to ambient air could cause the vial to begin to warm up and could reduce the potency of the medicine or taint the product in the cryo-state inside the vial.

Additionally, product is put into vials attached to a cane and then placed into a cryogenic container for freezing. Someone then must validate each vial on the cane and make sure it is associated with the correct tag on the top of the cane. Canes are pulled from the production box and placed into a larger storage tub and checked again. Canes are then pulled and packed into shipping sleeves, checked again, counted, and tagged with a round metal label. Prior to final packing each shipping sleeve is pulled again, checked, counted and returned. The biggest issue besides mixing up different vials within a cane is shipping a non-certified product to a particular country, which could result in loss of the manufacturer's certification and hefty civil penalties, both of which are undesirable.

What is needed therefore is a RFID system and/or method that allows the RFID tag to be placed on a cryogenic vial that will be exposed to extreme environments and read without the product in the vial having a prolonged exposure to ambient air. What is also needed is a RFID system that provides for a more efficient process of validating each vial and cane to ensure that the vials and canes don't get mixed up and shipped to the wrong location.

The present invention discloses a two-part system for RFID enabling of cryo-vials. A primary RFID tag is created and attached to a top of the cane such that the tag protrudes or extends from the top of the cane in the general direction of the operator, thereby enabling the operator to read all the primary RFID tags and validate the same against the lot number and/or order number. Individual secondary RFID tags are then placed on each vial which associates these vials to the primary RFID tag on the cane or on the packaging.

SUMMARY

The following presents a simplified summary in order to provide a basic understanding of some aspects of the disclosed innovation. This summary is not an extensive overview, and it is not intended to identify key/critical elements or to delineate the scope thereof. Its sole purpose is to present some concepts in a simplified form as a prelude to the more detailed description that is presented later.

The subject matter disclosed and claimed herein, in one aspect thereof, comprises a system and method which provides RFID enabling for cryo-vials and other cryogenic items. The system and method is a two-part method wherein each vial is individually RFID tagged and then a plurality of tagged vials are secured onto a cane. Specifically, a primary RFID tag is created and attached to the top of the cane containing the vials. The RFID tag can be either attached directly to the top of the vial or to an additional support member or extension applied to the top of the vial. The individual secondary RFID tags on the vials are then associated with the primary RFID tag on the cane. Thus, when it comes time to read the primary RFID tags, a user pulls out the transport container containing the canes and reads all of the primary RFID tags extending outwardly from the canes without having to remove the vials from the liquid nitrogen or other coolant contained in the transport container. Validation is then performed on the primary RFID tag, comparing the primary RFID tag against the lot number and/or order number of the shipment, as well as comparing the associated secondary RFID tags.

In a preferred embodiment of the present invention, the primary RFID tag is made of tag stock that can withstand temperatures as low as −80° C., meaning that the primary RFID tag will not break off from the cane if disturbed and if adhesive is used, the adhesive will still hold the tag to the vial at the respective temperatures. The primary RFID tag also comprises an adhesive that bonds the primary RFID tag to the cane and the same or similar adhesive can also be used to bond the secondary RFID tag to the vial. The tagged vials are typically cryogenic vials that are able to be stored in a cryogenic freezer for transport and storage. The canes typically hold at least five vials and are transported in a large transport container that can hold a plurality of canes within liquid nitrogen or other coolant for transport and/or storage.

To the accomplishment of the foregoing and related ends, certain illustrative aspects of the disclosed innovation are described herein in connection with the following description and the annexed drawings. These aspects are indicative, however, of but a few of the various ways in which the principles disclosed herein can be employed and is intended to include all such aspects and their equivalents. Other advantages and novel features will become apparent from the following detailed description when considered in conjunction with the drawings.

BRIEF DESCRIPTION OF THE DRAWINGS

Advantages of embodiments of the present invention will be apparent from the following detailed description of the exemplary embodiments thereof, which description should be considered in conjunction with the accompanying drawings in which like numerals indicate like elements, in which.

DETAILED DESCRIPTION

Figure 1:
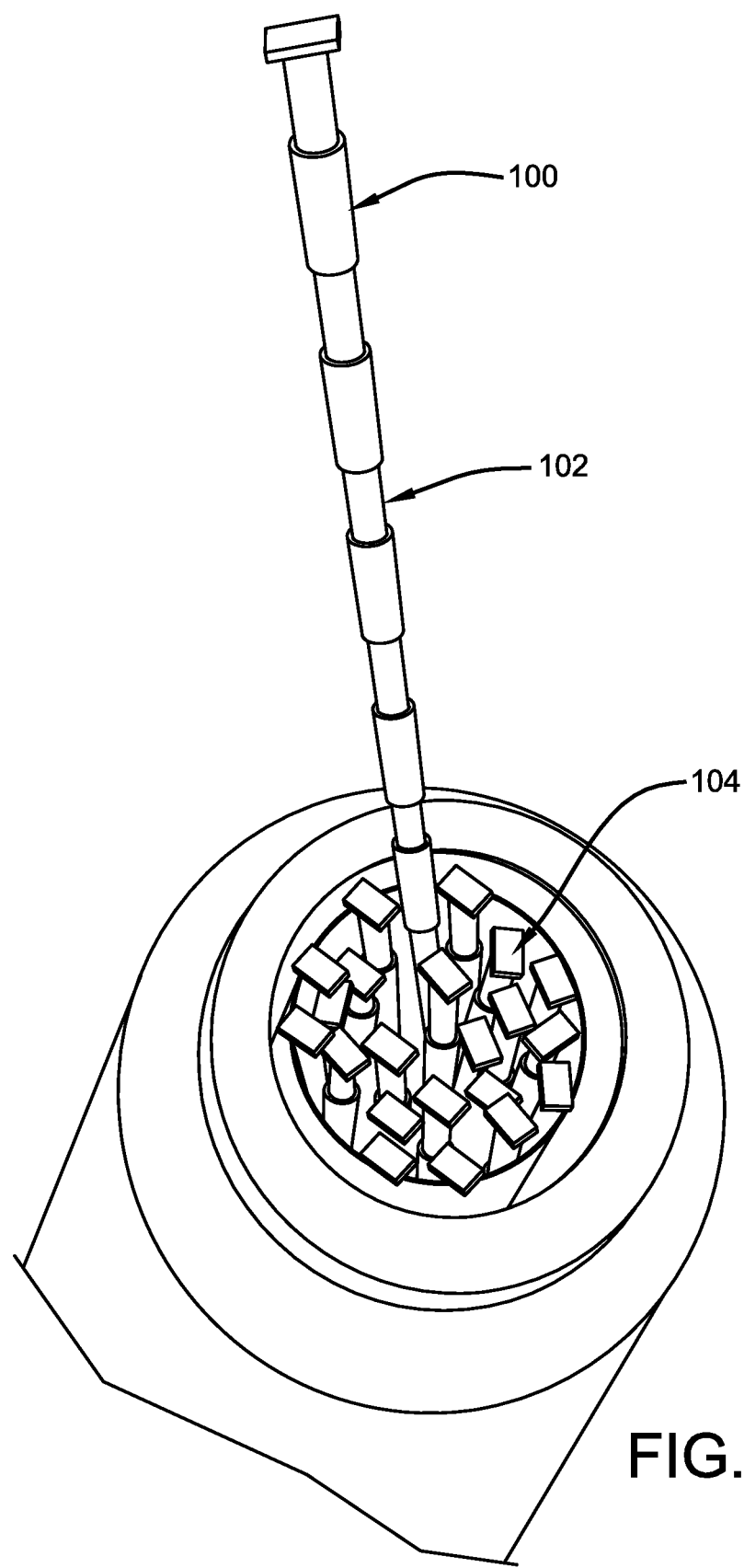
FIG. 1 illustrates a top perspective view of the transport container with a cane pulled out in accordance with the disclosed architecture.

The innovation is now described with reference to the drawings, wherein like reference numerals are used to refer to like elements throughout. In the following description, for purposes of explanation, numerous specific details are set forth in order to provide a thorough understanding thereof. It may be evident, however, that the innovation can be practiced without these specific details. In other instances, well-known structures and devices are shown in block diagram form in order to facilitate a description thereof.

The present invention discloses a two-part system for RFID enabling of cryo-vials. An RFID tag is created and attached to a top of a cane containing multiple cryo-vials. The RFID tag extends outwardly from the top of the cane in the general direction of an operator to enable the operator to read all of the RFID tags in a transport container and validate the same against the lot number and/or order number. Then, individual RFID tags are placed on each vial which allows these vials to be associated with the parent RFID tag on the cane or on the packaging.

Figure 2:
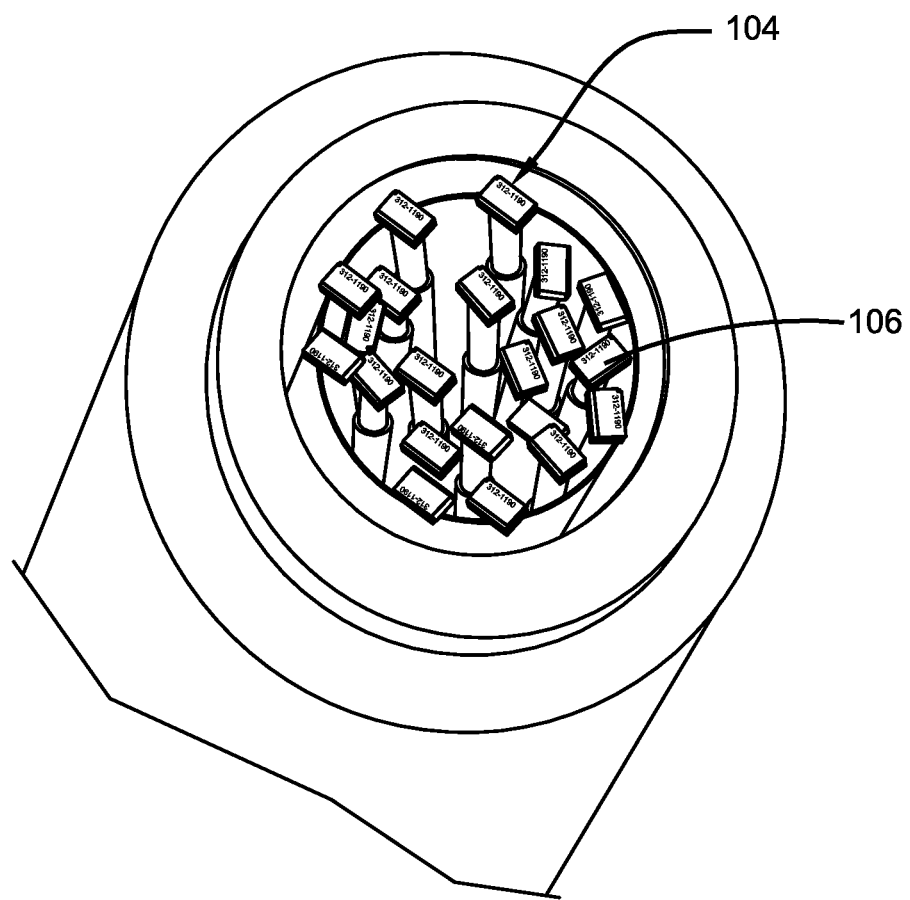
FIG. 2 illustrates a top perspective view of the transport container storing a plurality of canes for transport in accordance with the disclosed architecture.
Figure 3:
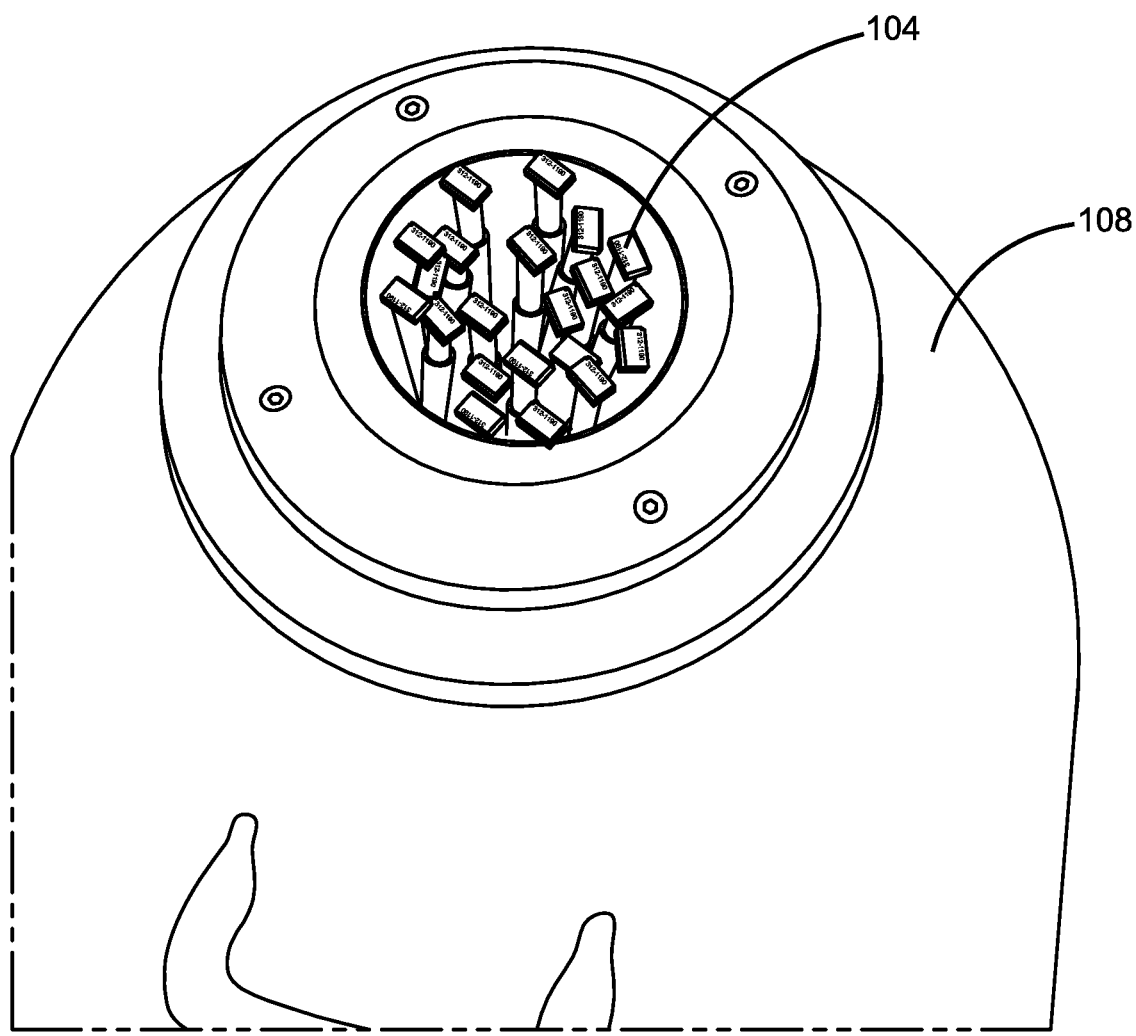
FIG. 3 illustrates a top perspective view of the transport container with a cane with a metal stamp thereon pulled out in accordance with the disclosed architecture.

Referring initially to the drawings, FIGS. 1-3 illustrate the transport container 108 with a plurality of canes 102 secured therein for transport. The transport container 108 may any type of transport container that can safely and securely transport cryogenic vials within liquid nitrogen or other suitable coolant, as is known in the art. Typically, the transport container 108 is cylindrical in shape but the container 108 can be any suitable size, shape, and configuration as is known in the art without affecting the overall concept of the invention. One of ordinary skill in the art will appreciate that the shape and size of the transport container 108 as shown in FIGS. 1-3 is for illustrative purposes only, and that many other shapes and sizes of the transport container 108 are well within the scope of the present disclosure. Although dimensions of the transport container 108 (i.e., length, width, and height) are important design parameters for good performance, the transport container 108 may be any shape or size that ensures optimal performance during use and suits user preferences.

Typically, the transport container 108 stores a plurality of canes 102 in liquid nitrogen or other suitable coolant within its center. The transport container 108 can store as many canes 102 as is known in the art, and the canes 102 are removed via the round metal holders in the container 108, as is well known in the art. As shown in the FIGS., canes 102 are generally elongated structures that are used as transport mechanisms for the vials 100. Each cane 102 typically holds five vials 100, but may be designed to hold as many vials 100 as is needed. The top 104 of the cane 102 comprises a metal stamp 106 with lot numbers printed thereon that correspond to lot numbers on the vials 100.

Figure 4:
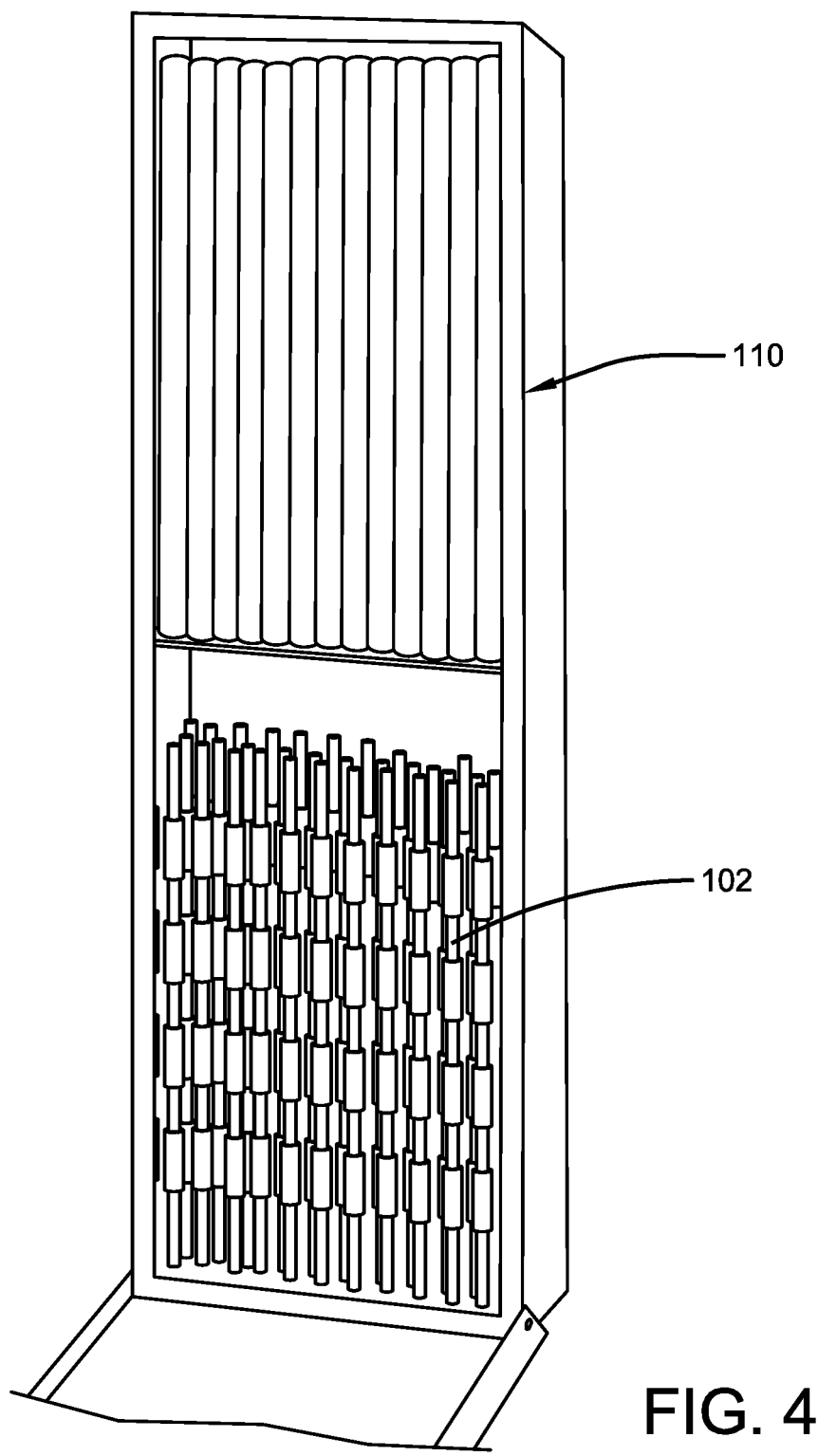
FIG. 4 illustrates a perspective view of a storage container from manufacturing to shipping in accordance with the disclosed architecture.

The vials 100 are made of any suitable cryogenic material as is known in the art. The vials 100 are transported from manufacturing to shipping in a storage container 110, as shown in FIG. 4. The vials 100 can be any suitable size, shape, and configuration as is known in the art without affecting the overall concept of the invention. One of ordinary skill in the art will appreciate that the shape and size of the vials 100 as shown in FIGS. 1-3 is for illustrative purposes only and many other shapes and sizes of the vials 100 are well within the scope of the present disclosure. Although dimensions of the vials 100 (i.e., length, width, and height) are important design parameters for good performance, the vials 100 may be any shape or size that ensures optimal performance during use and suits used preference.

Figure 5:
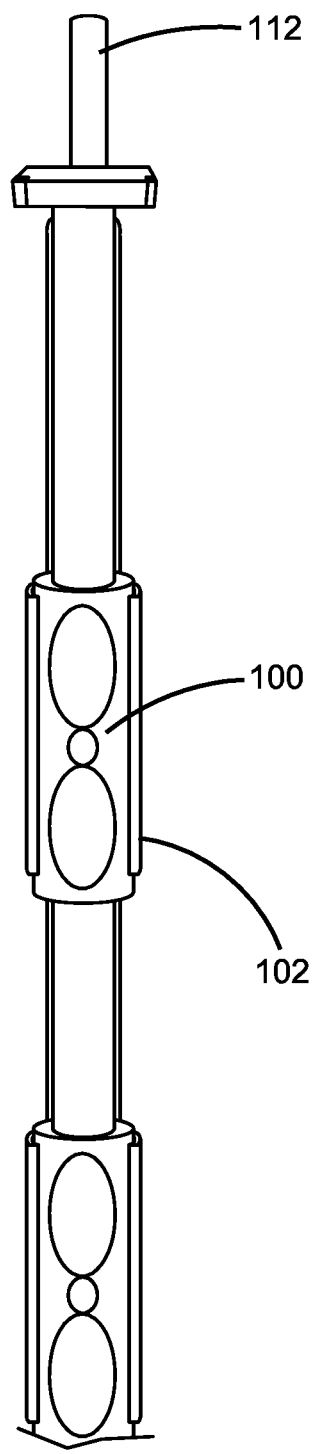
FIG. 5 illustrates a front perspective view of a cane with a primary RFID tag structure secured to its top in accordance with the disclosed architecture.
Figure 6:
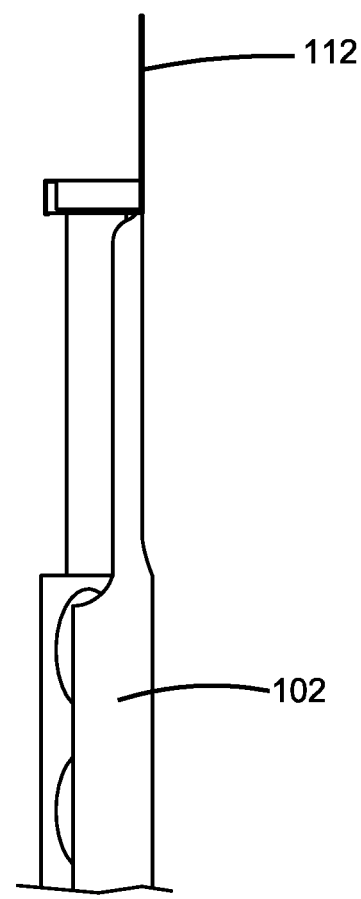
FIG. 6 illustrates a side perspective view of the cane with the primary RFID tag structure secured to its top in accordance with the disclosed architecture.
Figure 7:
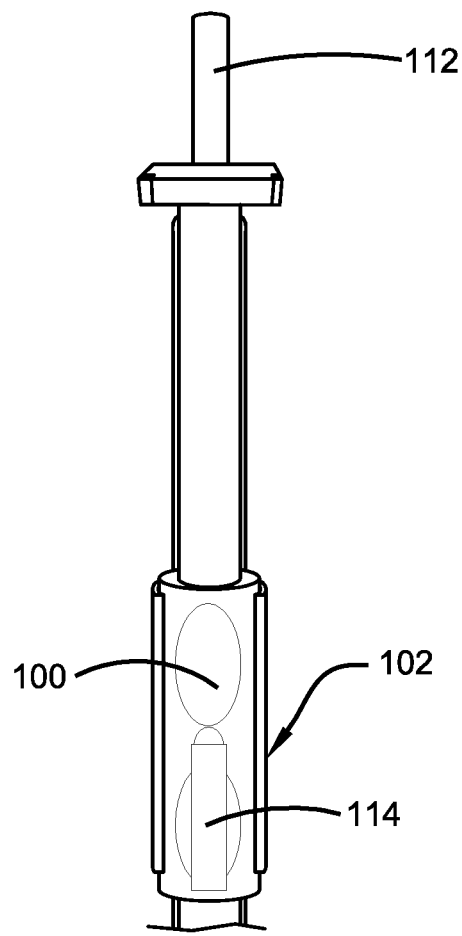
FIG. 7 illustrates a front perspective view of a vial with a secondary RFID tag structure secured on it within the cane in accordance with the disclosed architecture.

Referring to FIGS. 5-7, disclosed is a two-part system for RFID enabling of cryo-vials 100. Specifically, a primary RFID tag 112 is created and attached to the top 104 of cane 102 of multiple cryo-vials 100. The primary RFID tag 112 preferably extends outwardly from the top of cane 102 and stamp 106 to enable a user to read all the primary RFID tags 112 in a transport container 108, and to validate against the lot number and/or order number. The system would allow a user to read 100% of the primary RFID tags 112 either close to or just above the liquid nitrogen in the transport container 108.

The primary RFID tag 112 is made of tag stock that can withstand temperatures at least as low as −80° C., such that it will not break off from the cane 102 if disturbed. Typically, the tag stock is comprised of but it can be any suitable tag stock as is known in the art as long as the tag stock can withstand temperatures of at least −80° C. Furthermore, the primary RFID tag 112 is bonded or secured to the cane 102 via an adhesive that can withstand temperatures of at least −80° C. and still adhere the primary RFID tag 112 to the cane 102. Typically, the adhesive is any suitable adhesive as is known in the art as long as the adhesive can withstand temperatures of at least −80° C. and still adhere the primary RFID tag 112 to the cane 102.

The primary RFID tag 112 would be any type of thickness but could be any thickness as is known in the art without affecting the overall concept of the invention. Additionally, the primary RFID tag 112 will be generally rectangular in shape and small in size, preferably 0.5"×3.0", but any suitable size, shape, and configuration can be used as is known in the art without affecting the overall concept of the invention. One of ordinary skill in the art will appreciate that the shape and size of the primary RFID tag 112 as shown in FIGS. 5-7 is for illustrative purposes only and many other shapes and sizes of the primary RFID tag 112 are well within the scope of the present disclosure. Although dimensions of the primary RFID tag 112 (i.e., length, width, and height) are important design parameters for good performance, the primary RFID tag 112 may be any shape or size that ensures optimal performance during use and suits user preferences.

As previously mentioned, primary RFID tag 112 is attached to and extends outwardly from the top 104 of cane 102, preferably adjacent to stamp 106, as best shown in FIGS. 5-7. More specifically, RFID tag 112 preferably extends outwardly from cane 102 by at least 1", such that a user would be able to read 100% of the primary RFID tags 112 either close to or just above the liquid nitrogen or other coolant in the transport container 108 and without having to remove the vials 100 from the coolant, which could damage the contents of the vials 100.

Then, individual secondary RFID tags 114 are attached to each vial 100 which allows these vials 100 to be associated with the primary RFID tag 112 on the cane 102 or on the packaging. Furthermore, the secondary RFID tag 114 is bonded to the vial 100 via an adhesive that can withstand temperatures of at least −80° C. and still adhere the secondary RFID tag 114 to the vial 100. Typically, the adhesive can be any suitable adhesive as is known in the art as long as the adhesive can withstand temperatures of at least −80° C. and still adhere the secondary RFID tag 114 to the vial 100.

Figure 8A:
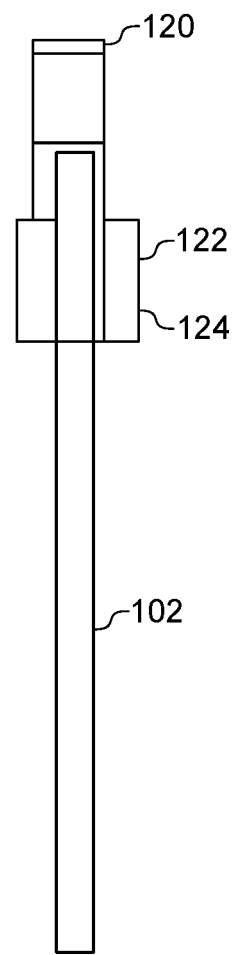
FIG. 8A and FIG. 8B each show a further embodiment of the present invention in which a supporting material is attached to the cane to hold the RFID tag structure.
Figure 8B:
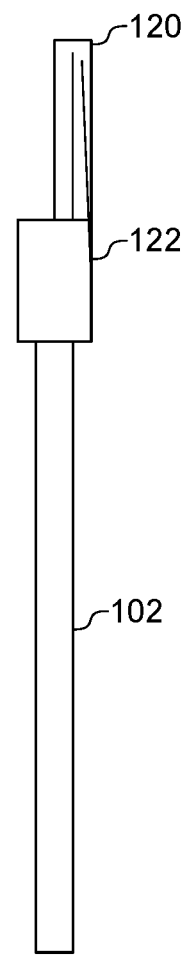

Turning now to FIG. 8A and FIG. 8B, an alternate embodiment is shown in which a supporting material 120 is attached to the cane 102 via a label 122. The supporting material is a structural or functional material to support the RFID tag when the tag is applied to the cane 102. The structural material may also have conductive properties allowing for potential expansion of the read range of the RFID tag. The structural material 120 is attached to the cane 102 via label 122. The label is provided with wings 124 which will allow the label to be wrapped around the cane 102. Exemplary adhesive products are available from Avery Dennison Label and Graphics Material Division of Avery Dennison Corporation of Mentor, Ohio.

What has been described above includes examples of the claimed subject matter. It is, of course, not possible to describe every conceivable combination of components or methodologies for purposes of describing the claimed subject matter, but one of ordinary skill in the art may recognize that many further combinations and permutations of the claimed subject matter are possible. Accordingly, the claimed subject matter is intended to embrace all such alterations, modifications and variations that fall within the spirit and scope of the appended claims. Furthermore, to the extent that the term "includes" is used in either the detailed description or the claims, such term is intended to be inclusive in a manner similar to the term "comprising" as "comprising" is interpreted when employed as a transitional word in a claim.

What is claimed is:

1. A system for radio-frequency identification (RFID) enabling items comprising:
   applying a primary RFID tag (112) to a cane (102), wherein the cane comprises a plurality of vials (100) attached to said cane, the cane comprises a top (104) having a metal stamp (106) with lot numbers printed thereon; and
   applying a secondary RFID tag (114) to each of said plurality of vials; wherein the secondary RFID tag is associated with the primary RFID tag thereby enabling the plurality of vials to be associated with the primary RFID tag such that the primary RFID tag is validated by comparing the primary RFID tag against a lot number and/or order number of the shipment and the associated secondary RFID tag.

2. The system of claim 1, wherein each of said plurality of vials is a cryogenic vial and can withstand temperatures of −80° C.

3. The system of claim 1, wherein the cane is a cryogenic cane and can withstand (i) temperatures of −80° C. and (ii) being placed in liquid nitrogen.

4. The system of claim 1, wherein the plurality of vials comprises at least five vials.

5. The system of claim 1, wherein the primary RFID tag extends outwardly from a top of the cane.

6. The system of claim 1, wherein the primary RFID tag is secured to the cane by an adhesive which can withstand temperatures of −80° C.

7. The system of claim 1, wherein the primary RFID tag is comprised of tag stock which can withstand temperatures of −80° C.

8. The system of claim 1, wherein the primary RFID tag is preferably 0.5"×3" in size.

9. The system of claim 1, wherein the secondary RFID tag is secured to each of said plurality of vials by an adhesive which can withstand temperatures of −80° C.

10. The system of claim 1, wherein the secondary RFID tag is comprised of tag stock which can withstand temperatures of −80° C.

11. A radio-frequency identification (RFID) system for use in a cryogenic environment comprising:
   a cane (102) comprising a top (104) having a metal stamp (106) with lot numbers printed thereon;
   a primary RFID tag attached to said cane;
   at least one cryogenic vial attached to said cane corresponding to the lot numbers of the at least one cryogenic vial; and
   a secondary RFID tag attached to said at least one cryogenic vial, wherein the secondary RFID tag is associated with the primary RFID tag thereby enabling the plurality of vials to be associated with the primary RFID tag such that the primary RFID tag is validated by comparing the primary RFID tag against a lot number and/or order number of the shipment and the associated secondary RFID tag.

12. The RFID system of claim 11, wherein the primary RFID extends outwardly from the stamp.

13. The RFID system of claim 11, wherein the primary RFID tag is secured to the cane by an adhesive which can withstand temperatures of −80° C.

14. The RFID system of claim 11, wherein the cane is cryogenic and can withstand (i) temperatures of −80° C. and (ii) being placed in liquid nitrogen.

15. The RFID system of claim 11, wherein the primary RFID tag is comprised of tag stock which can withstand temperatures of −80° C.

16. The RFID system of claim 11, wherein the primary RFID tag is preferably 0.5"×3.0" in size.

17. The RFID system of claim 11, wherein the secondary RFID tag is secured to the at least one cryogenic vial by an adhesive which can withstand temperatures of −80° C.

18. The RFID system of claim 11, wherein the secondary RFID tag is comprised of tag stock which can withstand temperatures of −80° C.

19. A method for radio-frequency identification (RFID) enabling items comprising:
   attaching a primary RFID tag to a cryogenic cane using an adhesive which can withstand temperatures of −80° C., wherein the cryogenic cane comprises at least five cryogenic vials attached thereto, and the cane includes a top having a metal stamp with lot numbers printed thereon; and
   attaching a secondary RFID tag to each cryogenic vial attached to said cryogenic cane using an adhesive which can withstand temperatures of −80° C., wherein the secondary RFID tag applied to each cryogenic vial is associated with the primary RFID tag attached to the cryogenic cane thereby enabling the plurality of vials to be associated with the primary RFID tag such that the primary RFID tag is validated by comparing data encoded in the primary RFID tag against a lot number and/or order number of the shipment and data in the associated secondary RFID tag.

20. The method of claim 19, wherein the primary RFID tag and the secondary RFID tag are both comprised of tag stock which can withstand temperatures of −80° C. and further wherein the secondary RFID tag is passive.

* * * * *